United States Patent [19]
Roberson

[11] Patent Number: 5,192,051
[45] Date of Patent: Mar. 9, 1993

[54] UNIDIRECTIONAL SEAT SEAL FOR GATE VALVE

[75] Inventor: Willie C. Roberson, Spring, Tex.

[73] Assignee: ABB Vetco Gray Inc., Houston, Tex.

[21] Appl. No.: 922,710

[22] Filed: Jul. 30, 1992

[51] Int. Cl.$^5$ .................................................. F16K 3/00
[52] U.S. Cl. ....................................... 251/328; 73/49.8
[58] Field of Search ...................... 251/328, 363, 326; 73/49.8

[56] References Cited

U.S. PATENT DOCUMENTS

| | | | |
|---|---|---|---|
| 3,803,901 | 4/1974 | McConnell et al. | 73/49.8 |
| 4,161,309 | 7/1979 | Klyce | 251/328 |
| 4,741,509 | 5/1988 | Bunch et al. | 251/328 X |

FOREIGN PATENT DOCUMENTS 1514463  6/1978  United Kingdom ................ 251/328

*Primary Examiner*—John C. Fox
*Attorney, Agent, or Firm*—James E. Bradley

[57] ABSTRACT

A gate valve has seat seals located in a cavity between seat rings and a counterbore formed in the flow passage. The seat seals block flow from an inner to an outer direction, but allow flow in the opposite direction. The seat seals are held in position by standoff rings. Flowby passages in the standoff rings assure that the standoff rings will not seal when a surge of test pressure is applied to the seal in a direction opposite to the normal direction that is encounters flow.

9 Claims, 1 Drawing Sheet

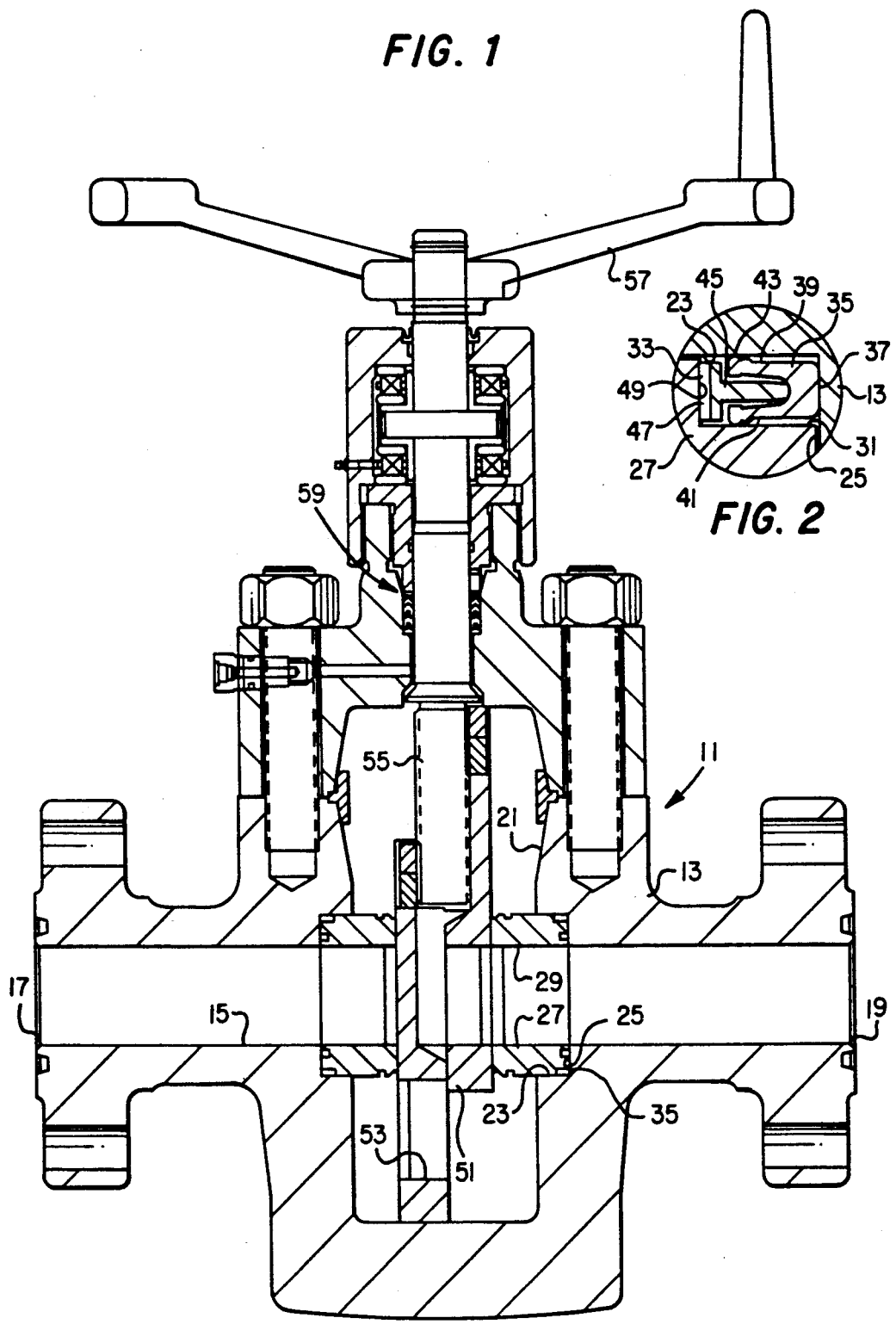

UNIDIRECTIONAL SEAT SEAL FOR GATE VALVE

BACKGROUND OF THE INVENTION

1. Field of the Invention

This invention relates in general to gate valves, and in particular to a seat seal which will block flow only in one direction.

2. Description of the Prior Art

A typical gate valve used in connection with oil and gas production has a body with a flow passage extending through it. The flow passage intersects a central cavity. Seat rings are placed in counterbores formed in the flow passage at the intersection of the flow passage with the cavity. A gate will be moved past the seats between open and closed positions to cause sealing.

The seats have seals which seal the seat to the counterbore of the flow passage. These seals prevent the entry of fluid from the central cavity or chamber of the body to the downstream flow passage. When the gate is opened, the seals perform no function. When the gate is closed, fluid will flow past the upstream seat into the chamber or cavity of the body. The fluid pressure in the chamber is sealed by the seal of the downstream seat.

A typical seal is U-shaped, having two legs which extend axially from a base. The base will bear against a counterbore shoulder, while the legs seal between the counterbore cylindrical wall and a cylindrical wall of the seat. A standoff ring inserts into the recess between the legs and bears against a shoulder on the seat that opposes the counterbore shoulder. The legs will seal when the pressure is outward directed across the seal, but are not intended to seal when pressure is inward directed across the seal.

Some operators periodically test the valve while installed in the field. A typical test involves closing the gate, then applying a surge of test pressure to the downstream side of the flow passage. Because the pressure is inward directed against the downstream seal, it is intended that the pressurized fluid flow past this downstream seal, into the cavity and act against the upstream seal. The upstream seal, having pressure acting against it in an outward direction, will seal.

One problem from applying this surge of test pressure is that the downstream seal may not always allow the pressure to flow by, rather it may seal itself. As the pressure is directed in the wrong direction against the downstream seal during a pressure test, the sealing is accomplished only by extreme deformation of the downstream seal, with the downstream seal and standoff ring jamming toward the cavity. Consequently, while the test indicates that the valve is sealing, in actuality, the test is harming the downstream seal. Subsequently, when the fluid is flowing in a normal upstream to downstream direction and the gate is then closed, the downstream seal may not seal as it should.

SUMMARY OF THE INVENTION

In this invention, the downstream seal is provided with a flowby passage to assure that a surge of test pressure directed from the downstream side in an upstream direction flows past the downstream seal. Preferably the flowby passage extends through the standoff ring. Preferably the standoff ring has a flange on its end that contacts the seat shoulder. The flowby passage may be a series of slots or grooves cut in the contacting surface of the flange.

BRIEF DESCRIPTION OF THE DRAWINGS

FIG. 1 is a vertical sectional view illustrating a gate valve constructed in accordance with this invention.

FIG. 2 is an enlarged view of one of the seat seals of the valve of FIG. 1.

DETAILED DESCRIPTION OF THE INVENTION

Referring to FIG. 1, valve 11 has a body 13. A flow passage 15 extends transversely through body 13. Flow passage 15 has an downstream section 17 and a upstream section 19. The downstream section 17 and upstream section 19 refer to a right to left direction of flow of fluid through valve 11 in normal well flow operations. Downstream section 17 and upstream section 19 may be reversed, with the normal well flow left to right, because the valve is symmetrical.

Flow passage 15 intersects a central cavity or chamber 21 located in body 13. A counterbore is formed in flow passage 15 at each intersection with chamber 21. The counterbore has a cylindrical counterbore wall 23, which has an outer end terminating in a counterbore shoulder 25. Counterbore shoulder 25 is perpendicular to the axis of the flow passage 15.

A seat ring 27 locates in each counterbore. Each seat ring 27 is a cylindrical, tubular member having a passage 29 extending through it. Each seat ring 27 has a cylindrical reduced diameter surface 31 at its outer end. The cylindrical surface 31 terminates in an outward facing shoulder 33 on an inner end. Seat ring shoulder 33 will be opposed to counterbore shoulder 25 and axially spaced therefrom. Counterbore wall 23, counterbore shoulder 25, seat ring cylindrical surface 31 and seat ring shoulder 33 define an annular cavity which is rectangular in transverse cross-section, as illustrated in FIG. 2.

A seal 35 locates in each of the cavities. Seal 35 is generally U-shaped, having a base 37 and two depending legs 39, 41. Leg 39 has a greater diameter than leg 41. Each leg 39 has a sealing rib 43 on its free end. Sealing rib 43 of leg 39 contacts counterbore wall 23. Rib 43 of the lesser diameter leg 41 contacts the seat ring cylindrical surface 31. Base 37 will contact the counterbore shoulder 25. The free ends of the seal legs 39, 41 are spaced a short axial distance from the seat ring outward facing shoulder 33, and will not contact this shoulder 33.

A standoff ring 45 serves to prevent the legs 39, 41 from contacting the seat ring outward facing shoulder 33. Standoff ring 45 is an annular ring, having an inner diameter and an outer diameter. Standoff ring 45 extends into the recess between the legs 39, 41 in contact with the inner side of base 37. The greater diameter of standoff ring 45 is closely spaced to the greater diameter leg 39. The lesser diameter or bore of standoff ring 45 is closely spaced to the lesser diameter leg 41. Standoff ring 45 has a flange 47 on its inner end, providing a general T-shape in cross-section. Flange 47 has a dimension that is less than the distance between seat ring cylindrical surface 31 and counterbore wall 23, providing clearances.

A flowby passage means is incorporated with standoff ring 45 to assure that fluid can flow from an outer to an inner direction past seal 35, but not from an inner direction to an outer direction. In the embodiment shown, a series of flowby passages 49 are formed on the inner end of flange 47. Each flowby passage 49 is a groove or slot extending completely across the contacting surface of flange 47. Typically, there will be four to twelve slots (only one shown) evenly spaced around the flange 47.

Referring again to FIG. 1, valve 11 has a gate 51 in the embodiment shown. Gate 51 is split into two slabs, with the downstream slab being shown in a closed position, while the upstream slab is shown in an open position. In actuality, both slabs of gate 51 must either be open or closed at the same time. Gate 51 can be designed in two pieces or one piece. Each slab of gate 51 has a hole 53 extending through it which registers with flow passage 15 when the gate 51 is in the open position. A stem 55, when rotated, will cause the gate 51 to move between the open and closed positions. A handle 57 is employed for rotating the stem 55. A conventional packing assembly 59 provides sealing for stem 55.

In operation, with gate 51 in the open position and fluid flowing through flow passage 15, seals 35 will not perform any function. Fluid is able to communicate past the face of upstream seat ring 27 and gate 51 into the chamber 21. The pressure in chamber 21 will be essentially the same as the pressure in flow passage 15, thus resulting in no pressure differential across either the upstream or downstream seal 35.

When the gate 51 is moved to the closed position, as shown in the left side of FIG. 1, fluid will flow past the interface between the upstream seat ring 27 and gate 51 into chamber 21. The pressure in the chamber 21 will thus become the same as the pressure in the upstream section 19 of flow passage 15. The pressure will act on gate 51, pushing it in a downstream direction, tightly against the face of seat ring 27 on the downstream section 17. Sealing will occur at this interface. The pressure in chamber 21 will act in an outward direction on the downstream seal 35. The pressure will tend to force the legs 39, 41 tightly into engagement with the surfaces 31, 23. The ribs 43 will seal, preventing leakage past the downstream seal 35. The upstream seal 35 will not perform any sealing function at this point.

If an operator wishes to test the valve 11 with test pressure, normally there will be no pressure on the upstream section 19 of flow passage 15. The operator will close gate 51. The operator applies a surge of test pressure in the reverse direction to normal well flow. The pressure is applied to the downstream section 17 of flow passage 15. The surge of pressure will act in an axially inward direction on the downstream seal 35. The surge of pressure will push the seal 35 toward the seat ring outward facing shoulder 33. The surge of pressure will also push the seal 35 and stand off ring 49 toward the counterbore wall 23. The greater diameter leg 39 will tend to seal tightly against the counterbore wall 23 because of the reverse pressure surge. The standoff ring 45 will resist movement of the seal 35 toward the seat ring outward facing shoulder 33. The flowby passages 49 allow fluid to flow past the lesser diameter leg 41, across the flange 47 of standoff ring 45 and into the chamber 21. Test pressure may or may not leak past the interface of the downstream seat ring 27 and gate 51 into chamber 21.

The test pressure in chamber 21 also acts against the upstream seal 35. As the test pressure will be acting on the upstream seal 35 from an axially inner to an outer direction, the legs 39, 41 of upstream seal 35 will be spread apart into tight sealing engagement. Upstream seal 35 will thus seal in a normal manner. After the test, the operator removes the test pressure and opens the gate 51 for continued use.

The invention has significant advantages. The flowby passages in the standoff ring assure that a surge of test pressure acting on the downstream seal will flow across the downstream seal and into the chamber. These passages prevent the downstream seal from sealing, which would otherwise damage the seal.

While the invention has been shown in only one of its forms, it should be apparent to those skilled in the art that it is not so limited, but is susceptible to various changes without departing from the scope of the invention.

I claim:

1. In a gate valve having a body containing a chamber, a flow passage having an axis and extending transversely through and intersecting the chamber, a counterbore formed in the flow passage at each intersection with the chamber, a cylindrical seat ring located in each counterbore, a gate, and actuator means for moving the gate through the chamber between the seat rings between open and closed positions, an improved seal assembly located between each counterbore and each seat ring, comprising in combination:

each of the counterbores having a cylindrical counterbore wall terminating at an outer end with an inward facing shoulder, the inward facing shoulder being perpendicular to the counterbore wall;

a reduced diameter cylindrical surface formed on an outer end of each of the seat rings, defining an outward facing shoulder axially spaced from and opposing the inward facing shoulder, the outward facing shoulder, inward facing shoulder, reduced diameter cylindrical surface and counterbore wall defining an annular cavity;

an annular seal located in each of the cavities, the seal having a base on an outer end and two legs extending inward therefrom and separated by an annular recess, the base being positioned adjacent the inward facing shoulder, one of the legs being positioned to seal against the counterbore wall and the other of the legs being positioned to seal against the cylindrical surface when the gate is closed and outward directed pressure is applied to the seal;

a standoff ring located in each of the cavities, the standoff ring having an outer end extending into the recess of the seal into contact with the base and an inner end protruding axially from the recess for contact with the outward facing shoulder if inward directed test pressure is applied when the gate is closed, the seal having an inner diameter and an outer diameter; and the standoff ring having a flowby passage communicating the inner diameter of the seal to the outer diameter of the seal, to allow flowby past the seal when the inward directed test pressure is applied when the gate is closed.

2. The gate valve according to claim 1 wherein the flowby passage is a groove formed on the inner end of the standoff ring.

3. The gate valve according to claim 1 wherein the standoff ring has a flange located at its inner end that is parallel to the outward facing shoulder and has a contacting surface for contacting the outward facing shoulder, and wherein the flowby passage is a groove formed on the contacting surface of the flange.

4. In a gate valve having a body containing a chamber, a flow passage having an axis and extending transversely through and intersecting the chamber, a counterbore formed in the flow passage at each intersection with the chamber, a seat ring located in each counterbore, a gate, and actuator means for moving the gate through the chamber between the seat rings between open and closed positions, an improved seal means located between each counterbore and each seat ring, comprising in combination:

each of the counterbores having a cylindrical counterbore wall terminating at an outer end with an inward facing counterbore shoulder, the counterbore shoulder being perpendicular to the counterbore wall;

a reduced diameter cylindrical seat ring wall formed on an outer end of each of the seat rings, defining an outward facing seat ring shoulder axially spaced from and opposing the counterbore shoulder, the counterbore shoulder, seat ring shoulder, seat ring wall and counterbore wall defining an annular cavity;

an annular seal located in each of the cavities, the seal having a base and greater and lesser diameter legs separated by an annular recess, the base being positioned adjacent the counterbore shoulder, the greater diameter leg being positioned to seal against the counterbore wall and the lesser diameter leg being positioned to seal against the seat ring wall when the gate is closed and when outward directed fluid pressure is applied to the seal;

a standoff ring located in each of the cavities, the standoff ring having an outer end extending into the recess of the seal in contact with the base and an inner end protruding from the recess, the inner end having a flange which contacts the seat ring shoulder if inward directed test pressure is applied to the seal when the gate is closed; and a flowby passage extending across the standoff ring transverse to the axis of the flow passage to allow flowby past the lesser diameter leg of the seal and across the standoff ring between the seat ring and passage and into the chamber, when the gate is closed and when the inward directed test pressure is applied to the seal when the gate is closed.

5. The gate valve according to claim 4 wherein the flange has a contacting surface for contacting the seat ring shoulder, and wherein the flowby passage is a groove formed on the contacting surface of the flange.

6. A gate valve comprising in combination:
a body containing a chamber;
a flow passage having an axis and extending transversely through and intersecting the chamber, the flow passage having an upstream section and a downstream section;
upstream and downstream counterbores formed in the upstream and downstream sections, respectively, of the flow passage at each intersection with the chamber, each of the counterbores having a cylindrical counterbore wall terminating at a counterbore shoulder that is perpendicular to the counterbore wall;
upstream and downstream seat rings located in the upstream and downstream counterbores, respectively, each of the seat rings having a reduced diameter cylindrical seat ring wall defining a seat ring shoulder axially spaced from and opposing the counterbore shoulder, the counterbore shoulder, seat ring shoulder, seat ring wall and counterbore wall defining an annular cavity;
a gate;
actuator means for moving the gate through the chamber between the seat rings between open and closed positions;
upstream and downstream annular seals located in the cavities of the upstream and downstream seat rings, respectively, each of the seals having an outer end having a base and greater and lesser diameter legs separated by an annular recess extending inward from the base, the base being positioned to contact the counterbore shoulder, the greater diameter leg of the downstream seal being positioned to seal against the counterbore wall and the lesser diameter leg of the downstream seal being positioned to seal against the seat ring wall of the downstream seat ring when the gate is closed and when fluid pressure is applied to the upstream section of the flow passage;
upstream and downstream standoff rings located in the cavities of the upstream and downstream seat rings, respectively, each of the standoff rings having an outer end extending into the recess of one of the seals in contact with one of the bases and an inner end protruding from the recess, the inner end of each of the seals having a T-shaped flange, each of the standoff rings having an inner diameter and an outer diameter; and
a flowby passage extending from the inner diameter to the outer diameter of the downstream standoff ring to allow flowby past the lesser diameter leg of the downstream seal and across the downstream standoff ring into the chamber when the gate is closed and when a surge of test pressure is applied to the downstream section of the flow passage, the test pressure causing the upstream seal to seal in the cavity.

7. The gate valve according to claim 6 wherein each of the flanges has a contacting surface for contacting one of the seat ring shoulders, and wherein the flowby passage is a groove formed on the contacting surface of the flange of the downstream standoff ring.

8. A method of testing a gate valve having a body containing a chamber, a flow passage extending transversely through and intersecting the chamber, having an upstream section and a downstream section, upstream and downstream counterbores formed in the upstream and downstream sections, respectively, of the flow passage at each intersection with the chamber, upstream and downstream seat rings located in the upstream and downstream counterbores, respectively, an annular cavity located between each of the seat rings and each of the counterbores, a gate, actuator means for moving the gate through the chamber between the seat rings between open and closed positions, upstream and downstream annular seals located in the cavities of the upstream and downstream seat rings, respectively, each of the seals having a base and greater and lesser diameter legs separated by an annular recess, upstream and downstream standoff rings located in the cavities of the upstream and downstream seat rings, each standoff ring extending into the recess of one of the seals and protruding therefrom, the method comprising:

providing a flowby passage across the downstream standoff ring;
moving the gate to the closed position; and applying a surge of test pressure to the downstream section of the flow passage, allowing flowby past the lesser diameter leg of the downstream seal, through the flowby passage, into the chamber, and causing the upstream seal to seal in the cavity of the upstream seat ring.

9. The method according to claim 8 further comprising:

removing the test pressure; then moving the gate to the open position;

flowing fluid from the upstream section of the flow passage to the downstream section of the flow passage; then moving the gate to the closed position, causing the greater diameter leg and lesser diameter leg of the downstream seal to seal in the cavity.

* * * * *

UNITED STATES PATENT AND TRADEMARK OFFICE
CERTIFICATE OF CORRECTION

PATENT NO. : 5,192,051

DATED : March 9, 1993

INVENTOR(S) : Willie C. Roberson

It is certified that error appears in the above-indentified patent and that said Letters Patent is hereby corrected as shown below:

At column 2, line 14, "a" is changed to--an--;

At column 6, line 40, "Wherein" is changed to--wherein--.

Signed and Sealed this

Thirty-first Day of May, 1994

Attest:

BRUCE LEHMAN

Attesting Officer     Commissioner of Patents and Trademarks